United States Patent [19]
Liautaud

[11] 3,870,345
[45] Mar. 11, 1975

[54] TIGHT UNDERWATER CONNECTOR

[75] Inventor: Jean Alphonse Eugene Liautaud, Paris, France

[73] Assignee: Subsea Equipment Associates Limited, Hamilton, Bermuda

[22] Filed: Apr. 3, 1973

[21] Appl. No.: 347,526

[30] Foreign Application Priority Data
Apr. 7, 1972  France .............................. 72.12239

[52] U.S. Cl. ...................... 285/24, 166/6, 285/39, 285/315, 285/320, 285/334.2
[51] Int. Cl. ............................................ F16l 55/00
[58] Field of Search .......... 285/315, 334.2, 320, 39, 285/24, 402, 45, DIG. 21; 403/23, 51; 166/.6; 210/168

[56] References Cited
UNITED STATES PATENTS

| | | | |
|---|---|---|---|
| 73,422 | 1/1868 | Wilson ......................... | 285/334.2 X |
| 1,807,003 | 5/1931 | Nelson ........................... | 285/334.2 |
| 1,821,863 | 9/1931 | Wilson ........................... | 285/334.2 |
| 2,500,276 | 3/1950 | Church ......................... | 285/402 X |
| 2,650,664 | 9/1953 | Sorensen....................... | 285/402 X |
| 3,153,547 | 10/1964 | Chancellor et al. ............ | 285/402 X |
| 3,186,722 | 6/1965 | Johnston......................... | 403/51 X |
| 3,239,248 | 3/1966 | Jones ........................... | 285/DIG. 21 |
| 3,321,217 | 5/1967 | Ahlstone ....................... | 285/315 X |
| 3,442,535 | 5/1969 | Frohlich......................... | 285/320 X |

FOREIGN PATENTS OR APPLICATIONS
1,097,929   1/1962   Germany ........................... 285/402

Primary Examiner—Werner H. Schroeder
Assistant Examiner—Moshe I. Cohen
Attorney, Agent, or Firm—Sughrue, Rothwell, Mion, Zinn & Macpeak

[57] ABSTRACT

A connector for tightly joining together two submerged conduits. A submerged conduit 12 is provided with a flange 12a, above which is lowered a connector 22 comprising a piece 31 of the conduit 11 to be conneted to conduit 12. A conical base 37 facilitates the guiding and introduction of the plate assembly 21 by means of a tool which causes the lowering of the camming ring 10, thereby producing the locking of the connector by the engagement of the levers 9 on the flange 12a. An anti-fouling oil in container 19 keeps the sliding surfaces lubricated and aids the withdrawal of the unit by reversing the operation.

15 Claims, 1 Drawing Figure

PATENTED MAR 11 1975　　3,870,345
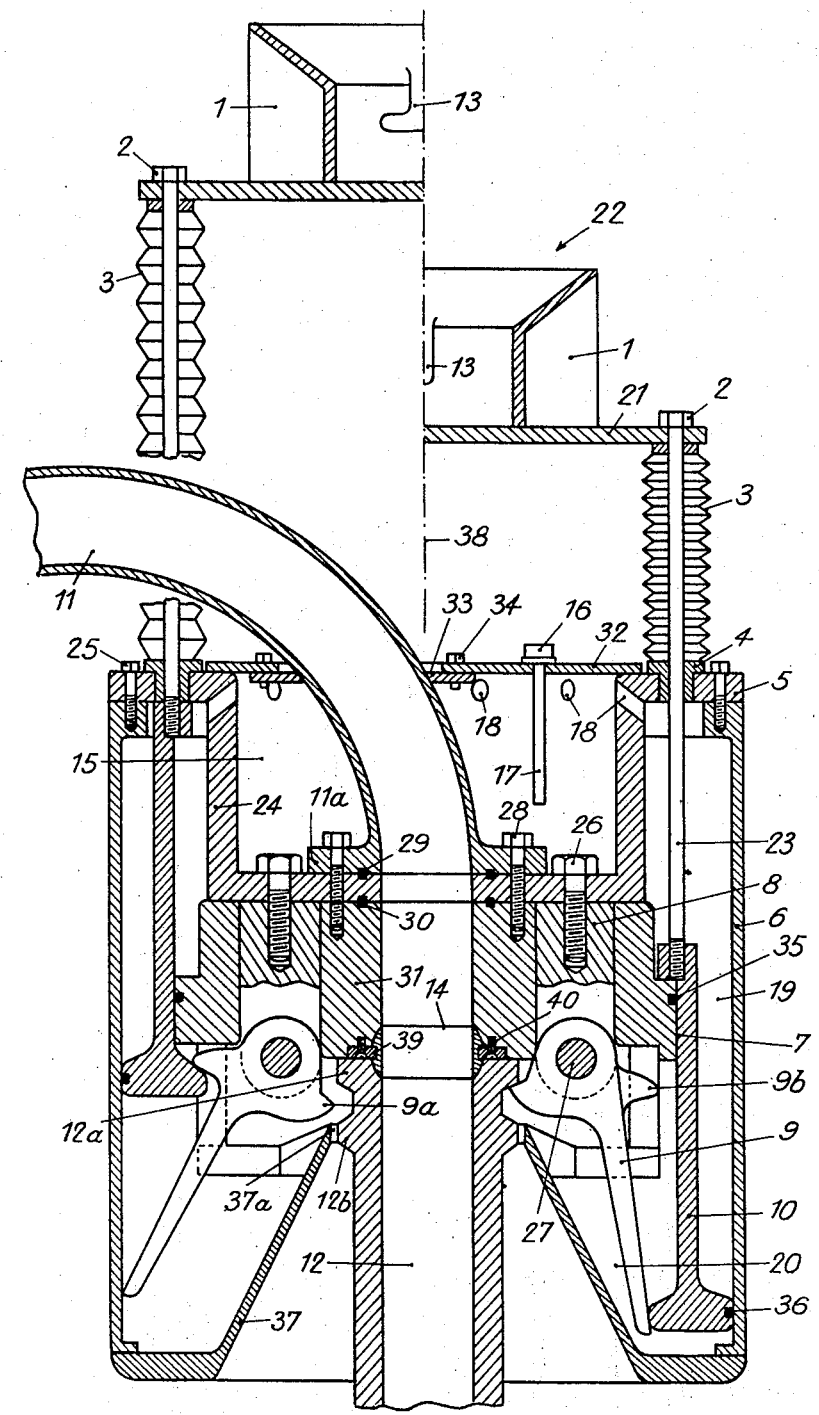

TIGHT UNDERWATER CONNECTOR

The invention relates to a connector, in particular an underwater connector, for joining together two submerged conduits.

Submerged conduits are joined, for example, in the working of submarine oil-fields. If the tight connection of conduits on the surface presents hardly any problems, connection carried out in deep water is, on the contrary, very difficult, since it must be carried out either by a diver or by a surface-controlled manoeuvre. Moreover, and principally in this latter case, the ever possible presence of a light deposit of marine fouling on the connection seatings of the conduits must be taken into account.

As the submarine connector preferably must be able to be withdrawn in spite of corrosion due to immersion, it will be understood that conventional connectors generally are not suitable for joining submarine conduits.

According to the present invention, a connector is provided for the connection of a first conduit to a second conduit. The connector comprises a unit having a connection seating for rigid attachment to an end of the first conduit and for being applied against a flange on the second conduit, the said unit having a lever locking device with a plurality of levers for co-operating with the second conduit, and a member for control of the said levers and movable from a first position in which the levers are in a disengaged position to a second position in which the said member is in contact with the arms of the said levers so that, when the connection seating of the said unit is applied to the flange of the second conduit, movement of the control member from its first to its second position successively causes the locking levers to catch on to the second conduit in use to clamp the said unit against the flange of the second conduit as long as the control member remains in the second position.

The advantage of this connector is not only that it can easily be controlled, as all that is necessary is to move a control member longitudinally from one position to another, but also that clamping and locking can be obtained which make the conduit connection tight in spite of fouling resulting from marine deposits. Such tight connection can be obtained by positioning a joint at the junction of the conduits and by giving the arms of the levers sufficient elasticity to compensate, at the end of run of the control member for slight differences in the positions of the levers. A further advantage is that the connector can be caught on to the second conduit right at the beginning of the motion of the control member, enabling any untimely rebound of the connector upon docking to be prevented in this way.

In one embodiment of the invention, the connector is adapted to be controlled in a conventional manner by a string of rods. In this embodiment, the control member of the locking levers is a ring sliding between two cylindrical surfaces, the said ring being rigidly connected to a piece with J-shaped slots, so that the simple thrust exercised by a lugged tool attached to a string of rods causes locking of the connection of the two, say, vertical conduits, disconnection being effected by simple traction of the lugged tool when the lugs are introduced into the horizontal portions of the slots.

Therefore, all that is necessary to connect a first conduit to a conduit situated on the aquatic bed is to use a simple string of rods guided by any known means, such as guide cables, a device for automatic guiding by remote control, or any other appropriate device, and to provide a simple guide cone at the base of the connector to form a tight connection by simple thrust or traction of the string of rods on the connector.

A further object of the invention is a connector of this type which permits prolonged use under water, characterised by the fact that the said control ring has at its lower end a rim with a seal co-operating with one of its cylindrical guide surfaces, the other cylindrical guide surface having a seal co-operating with the ring in such a way that the ring moves in an oil-filled, sealed annular volume communicating with a reservoir.

The locking lever control member thus moves in an oil-filled chamber and is protected from any marine deterioration. Because of this, the connector is able to function easily even after a prolonged period of immersion.

A further object of the invention is a connector of this type of which the first conduit, connection seating, locking levers, and the external walls of the connector are rigidly connected in one piece forming a volume which acts as an oil-reservoir for the annular volume.

A connector of compact structure, particularly well adapted for submarine connection, is thus obtained.

Further advantages and features of the invention will become apparent in the course of the following description in which reference is made to the attached drawing which illustrates, as a non-limiting example, an embodiment of the connector of the invention.

In the drawing, the single FIGURE is a section of the connector showing, in the left portion, a control member in its rest position and, in the right portion, the control member in its work position.

At 11 is shown a conduit rigidly connected to the control plate 21 of connector 22. At 13 tool 1, attached to connector 22, has J-shaped slots, the lower horizontal parts of which act as catch points for a lugged tool for withdrawal, by simple traction, of unit 22. The connector is thus manoeuvered by a string of rods which carries a lugged tool at its lower end.

Control plate 21 carries a set of connecting rods 23 surrounded by sealed, protective sleeves 3 in the form of bellows. These rods are attached at their lower, threaded ends to a control member in the form of a ring 10. The upper ends of these rods are attached to control plate 21 by any means, for example by nuts 2.

Connecting rods 23 slide in seals 4 seated on a wall 24 attached by screws 25, which extend through the flange 5 of wall 24, to cylindrical wall 6.

By means of screws 26, wall 24 carries the support 8 of the locking levers 9 unit, which locking levers bear lugs 9a and 9b. These levers turn about axes 27. At the centre of wall 24 is flange 11a of conduit 11 to be connected to conduit 12. Bolts 28 hold this flange against wall 24, thereby clamping seals 29. A connection piece 31 carrying a metal joint 14 provides an extension of conduit 11 and also is held by bolts 28, thereby clamping seals 30. Metal joint 14 is rigidly attached to the connection piece 31 by means of plate 39 and screws 40.

The chamber 15 formed by wall 24 is covered by a plate 32 in which an opening has been formed for passage of conduit 11. This opening is closed off by a tight connection 33 of any known type held in position at its periphery by bolts 34. As will be explained further hereinafter, the chamber 15 serves as an oil reservoir.

A filter 16 in the upper portion of pipe 17 permits the introduction of water into chamber 15. A channel 18 provides communication between chamber 15 and oil-containing annular volume 19 in which connecting rods 23 and ring 10 slide. This volume is rendered tight by seals 36 and 35 carried respectively on the external rim of the lower end of ring 10 and on a cylindrical guide surface 7 forming part of connection piece 31. The seals 35 and 36 separate the oil-containing annular volume 19 from the volume 20, which contains no oil.

A base 37 facilitates the introduction and centering of connector 22 on conduit 12 by means of a conical central portion.

When connector 22 is lowered, for example by means of a string of rods carrying a tool having lugs introduced into J-shaped slots 13, and after centering the connector 22 over conduit 12 by means of any device which facilitates centering, the conical portion of base 37 slides on the edges of flange 12a until connection piece 31 rests on the seating surface of flange 12a. The upper portion 37a of the base then rests against flange 12b. When metal joint 14, flange 12a, and connection piece 31 are in the positions indicated, vertical pressure is applied to control plate 21, causing the ring 10 of the locking levers 9 pass progressively from the position shown to the left of axis 38 to the position shown on the right of the FIGURE. Due to the lowering of ring 10, the volume of annular volume 19 increases so that the oil originally contained in chamber 15 is aspirated and added to the oil already contained in annular volume 19. This introduction of oil can be facilitated by introduction of water to the base of chamber 15 by means of pipe 17 fitted with filter 16 and use of an anti-fouling oil.

During lowering, the lower edge of ring 10 progressively pushes back the arms of locking levers 9, so that lugs 9a engage between flanges 12a and 12b and then push back flange 12a against connection piece 31, thus clamping metal joint 14 until it adopts the position shown to the right of axis 38. In this position, the tool which has been used for lowering control plate 21 can be withdrawn. The flexibility of the arms of levers 9 ensures perfect tightness of the connection formed between the conduits 11 and 12 in spite of play and fouling which may have been produced on flange 12a.

When it is required to disconnect conduits 11 and 12, all that is necessary is to introduce the lugs of a tool, attached to a string of rods for example, into the horizontal portions of J-shaped slots 13 and then to pull. Control plate 21 in turn pulls connecting rods 23 of ring 10 upwards. Because of the oil contained in annular volume 19, no untimely frictional resistance opposes the motion. The lower edge of ring 10 bearing seal 36, forces the oil through channel 18 into chamber 15. The oil forces back the water introduced on depression of the ring and this escapes to the outside through pipe 17. During lifting of the ring, the arms of locking levers 9 are progressively released and the internal edge of the lower end of ring 10 finally contacts lugs 9b and pushes them upwards, thus pivoting the levers, disengaging lugs 9a from flange 12a as shown in the left-hand portion of the FIGURE.

It will be noticed that connector 22 is once again in the same state as before and can immediately be used for connection to any other conduit having an appropriately designed flange.

The means for approach of the connector, enabling the axes of the connector and conduit 12 to be aligned by remote control, can be of any type. As they do not form part of the invention, these means will not be described.

What I claim is:

1. A connector for releasably connecting a first conduit to a second conduit on the bed of a body of water solely by an external force applied from the surface of the body of water by a single linear motion in the direction perpendicular to the open face of the second conduit, said connector comprising:
   a. a connection seating adapted to be rigidly attached to a first conduit adjacent to the open face thereof and to extend radially therefrom;
   b. a plurality of connecting rods slidably disposed in said connection seating for motion perpendicular to the open face of the first conduit when the connector is attached thereto;
   c. a control plate to which each of said plurality of connecting rods is rigidly connected and which simultaneously operates said plurality of connecting rods; and
   d. a plurality of locking levers pivotably mounted on said connection seating, each of said plurality of locking levers:
      i. being operatively connected to a related one of said plurality of connecting rods so that the linear motion of the related one of said plurality of connecting rods in the direction away from the open face of the first conduit when the connector is attached thereto and towards the open face of a second conduit to which the first conduit is to be attached will cause the locking lever to pivot about its axis from a first position to a second position and the linear motion of the related one of said plurality of connecting rods in the opposite direction will cause the locking lever to pivot about its axis from the second position to the first position and
      ii. having a lug thereon positioned to releasably engage the second conduit when the connector is attached to the first conduit, the open face of the second conduit is positioned in face to face relationship with the open face of the first conduit, and the locking lever is in its second position,
   whereby a first conduit to which the connector is attached may be releasably connected to a second conduit by first placing the open faces of the first and second conduits in face to face relationship and then forcing said plurality of connecting rods to slide in said connection seating in the direction perpendicular to the open face of the second conduit.

2. A connector as claimed in claim 1 wherein each of said plurality of locking levers is operatively connected to the related one of said plurality of connecting rods by means of two arms formed thereon and a cooperating lateral projection secured to the related one of said plurality of connecting rods and received between the two arms of the locking lever.

3. A connector as claimed in claim 2 wherein the one of the two arms of each of said locking levers against which the cooperating lateral projection extending from the related one of said plurality of connecting rods bears when the locking lever is in its second position is flexible, whereby the related one of said plurality of connecting rods can be forced to the end of its run in spite of play in the relative positioning of the first and second conduits.

4. A connector as claimed in claim 1 and further comprising a hollow cylindrical connection piece attached to said connection seating so as to function as an extension of the first conduit when said connection seating is attached thereto.

5. A connector as claimed in claim 4 wherein said cylindrical connection piece is countersunk at the end thereof remote from said connection seating and a metal joint is mounted in the countersink, whereby the metal joint can cooperate with a corresponding countersink in the face of the second conduit when the connector is used.

6. A connector as claimed in claim 1 and further comprising means for releasably attaching said control plate to a lugged tool attached to the end of a string of drill rods, whereby the connector may be attached to the end of a string of drill rods.

7. A connector for releasably connecting a first conduit to a second conduit on the bed of a body of water solely by an external force applied from the surface of the body of water by a single linear motion in the direction perpendicular to the open face of the second conduit, said connector comprising;
 a. a connecting seating adapted to be rigidly attached to a first conduit adjacent to the open face thereof and to extend radially therefrom;
 b. a plurality of connecting rods slidably disposed in said connection seating for motion perpendicular to the open face of the first conduit when the connector is attached thereto:
 c. a control plate to which each of said plurality of connecting rods is rigidly connected and which simultaneously operates said plurality of connecting rods;
 d. a hollow cylindrical wall rigidly attached to said connection seating concentrically and exteriorly of said connecting rods;
 e. a hollow cylindrical ring rigidly attached to said connecting rods at the end thereof remote from said connection seating, said ring having an external rim in sliding sealing contact with the internal surface of the hollow cylindrical wall to define the bottom of an annular volume which may be filled with oil and an internal rim which cooperates with the two arms on each of a plurality of locking levers to be recited;
 f. a plurality of locking levers pivotably mounted on said connection seating, each of said locking levers:
  i. being operatively connected to said ring by means of two arms formed thereon which receive the internal rim on said ring therebetween, whereby the linear motion of said connecting rods in the direction away from the open face of the first conduit when the connector is attached thereto and towards the open face of a second conduit to which the first conduit is to be attached will cause the locking lever to pivot about its axis from a first position to a second position and the linear motion of said connecting rods in the opposite direction will cause the locking lever to pivot about its axis from the second position to the first position and
  ii. having a lug thereon positioned to releasably engage the second conduit when the connector is attached to the first conduit, the open face of the second conduit is positioned in face to face relationship with the open face of the first conduit, and the locking lever is in its second position,
whereby a first conduit to which the connector is attached may be releasably connected to a second conduit by first placing the open faces of the first and second conduits in face to face relationship and then moving said control plate in the direction perpendicular to the open face of the second conduit.

8. A connector as claimed in claim 7 wherein the one of the two arms of each of said locking levers against which the internal rim of said ring bears when the locking lever is in its second position is flexible, whereby said connecting rods can be forced to the end of their run in spite of play in the relative positioning of the first and second conduits.

9. A connector as claimed in claim 7 and further comprising a hollow cylindrical connection piece attached to said connection seating so as to function as an extension of the first conduit when said connection seating is attached thereto.

10. A connector as claimed in claim 9 wherein said cylindrical connection piece is countersunk at the end thereof remote from said connection seating and a metal joint is mounted in the countersink, whereby the metal joint can cooperate with a corresponding countersink in the face of the second conduit when the connector is used.

11. A connector as claimed in claim 7 and further comprising means for releasably attaching said control plate to a lugged tool attached to the end of a string of drill rods, whereby the connector may be attached to the end of a string of drill rods.

12. A connector as claimed in claim 7 and further comprising a guide surface in the form of a truncated cone attached to the end of said hollow cylindrical wall at the end thereof remote from said connection seating, said guide surface tapering inwardly toward said connection seating.

13. A connector as claimed in claim 7 and further comprising a reservoir for oil, said reservoir being in fluid communication with the annular volume defined in part by said hollow cylindrical wall and said hollow cylindrical ring.

14. A connector as claimed in claim 13 and further comprising a pipe mounted in said reservoir, one end of said pipe opening into the bottom of said reservoir and the other end of said pipe opening into the exterior of the connector, whereby the interior of said reservoir is in fluid communication with the exterior of the connector.

15. A connector as claimed in claim 14 and further comprising a filter mounted in said pipe.

* * * * *